United States Patent
Kim et al.

(10) Patent No.: US 9,661,316 B2
(45) Date of Patent: *May 23, 2017

(54) MULTI-LAYER IMAGE DISPLAY DEVICE

(75) Inventors: Yong Beom Kim, Incheon (KR); Yang Rae Kim, Incheon (KR)

(73) Assignee: TOVIS CO., LTD., Incheon (KR)

( * ) Notice: Subject to any disclaimer, the term of this patent is extended or adjusted under 35 U.S.C. 154(b) by 108 days.

This patent is subject to a terminal disclaimer.

(21) Appl. No.: 13/582,238

(22) PCT Filed: Mar. 2, 2011

(86) PCT No.: PCT/KR2011/001444
§ 371 (c)(1),
(2), (4) Date: Aug. 31, 2012

(87) PCT Pub. No.: WO2011/108847
PCT Pub. Date: Sep. 9, 2011

(65) Prior Publication Data
US 2012/0327082 A1    Dec. 27, 2012

(30) Foreign Application Priority Data

Mar. 4, 2010 (KR) .......................... 10-2010-0019584

(51) Int. Cl.
*G06T 15/00*    (2011.01)
*H04N 13/04*    (2006.01)
(Continued)

(52) U.S. Cl.
CPC ..... *H04N 13/0495* (2013.01); *G02B 27/2278* (2013.01); *G02F 1/1347* (2013.01); *G02F 2201/44* (2013.01)

(58) Field of Classification Search
CPC ............... H04N 13/0495; H04N 3/459; G02B 27/2278; G02F 1/1347; G02F 2201/44
(Continued)

(56) References Cited

U.S. PATENT DOCUMENTS 5,764,317 A    6/1998  Sadovnik et al.
6,023,277 A *  2/2000  Osaka et al. .................. 345/419
(Continued)

FOREIGN PATENT DOCUMENTS

GB    2 437 553 A    10/2007
JP    04-009003 A    1/1992
(Continued)

*Primary Examiner* — Charles Tseng
(74) *Attorney, Agent, or Firm* — Rabin & Berdo, P.C.

(57) ABSTRACT

A multi-layered image display device for realizing a multi-layered image with a depth by overlapping a plurality of two-dimensional images includes: a display which can be selectively transparent and produce a first two-dimensional image through a combination of a plurality of pixels, a screen which is disposed behind the display so as to be overlapped in a forward-backward direction with the display; and a projector which is disposed behind the screen so as to project a second two-dimensional image on the screen. By adopting a screen and a projector instead of a rear display and a backlight unit, the cross stripes of the rear display can be removed so as to prevent the occurrence of the interference pattern (Moire phenomenon) due to the interference of different pixel patterns, and an additional diffuse layer can be omitted so that an assembling process of the multi-layer image display device can be simplified.

9 Claims, 5 Drawing Sheets

(51) Int. Cl.
*G02F 1/1347* (2006.01)
*G02B 27/22* (2006.01)

(58) Field of Classification Search
USPC .................................. 345/419; 348/14.07, 42
See application file for complete search history.

(56) References Cited

U.S. PATENT DOCUMENTS

| | | | |
|---|---|---|---|
| 6,481,851 B1* | 11/2002 | McNelley et al. | 353/28 |
| 6,906,762 B1* | 6/2005 | Witehira et al. | 349/73 |
| 7,573,491 B2* | 8/2009 | Hartkop et al. | 345/672 |
| 2005/0264560 A1 | 12/2005 | Hartkop et al. | |
| 2009/0290079 A1* | 11/2009 | Evans et al. | 349/18 |
| 2012/0140304 A1* | 6/2012 | Kuhlman et al. | 359/228 |

FOREIGN PATENT DOCUMENTS

| | | |
|---|---|---|
| JP | 2000-333212 A | 11/2000 |
| JP | 2001-320738 A | 11/2001 |
| JP | 2003-107402 A | 4/2003 |
| KR | 10-0614419 B1 | 8/2006 |
| KR | 10-2007-0104209 A | 10/2007 |
| KR | 10-2007-0104213 A | 10/2007 |
| WO | WO-2004/023200 A1 | 3/2004 |
| WO | WO-2004/086123 A1 | 10/2004 |

* cited by examiner

MULTI-LAYER IMAGE DISPLAY DEVICE

FIELD OF THE INVENTION

The present invention relates to a multi-layer image display device to realize a multi-layered image with a depth by overlapping multiple two-dimensional images.

BACKGROUND ART

Conventionally, in order to realize a multi-layered image with a depth, a method of overlapping a plurality of liquid crystal display (LCD) panels has been introduced.

In this case, there is a problem that a noise (interference pattern) such as wood grain and water wave due to the interference between the overlapped LCD panels occurs. That is, if a plurality of LCD panels having cross stripes by pixels are closely disposed, a noise occurs by the Moire phenomenon.

Technologies for preventing such noises have been introduced. For example, in Korean Patent registration No. 10-0614419 (Applicant: deep video imaging limited, Title of the invention: Multi-layered display), a diffuse layer for diffusing light is interposed between two LCD panels to remove noise by the overlap of the LCD panels.

However, in case of interposing a diffuse layer between two LCD panels, a process of disposing the diffuse layer between the LCD panels and then assembling the same is required, so an additional assembling process is required and the productivity is deteriorated. In addition, since this method reduces the noise by diffusing cross stripes of the rear LCD panel through the diffuse layer, the occurrence of noise cannot be fundamentally removed.

DETAILED DESCRIPTION OF THE INVENTION

Technical Problem

The present invention has been made in an effort to provide a multi-layer image display device in which image noise due to the interference between overlapped displays and the assembling thereof is easy.

Further, the present invention has been also made in an effort to provide a multi-layer image display device which has various depths.

Technical Solution

A multi-layer image display device for realizing a multi-layered image with a depth by overlapping a plurality of two-dimensional images according to an exemplary embodiment of the present invention includes: a display which can be selectively transparent and produce a first two-dimensional image through a combination of a plurality of pixels, a screen which is disposed behind the display so as to be overlapped in a forward-backward direction with the display; and a projector which is disposed behind the screen so as to project a second two-dimensional image on the screen.

The display may be a liquid crystal display device.

The screen may be a transparent screen of a rear surface projection type, and the projector may transmit light through the display.

The projector may be an LCOS type or a DLP type.

The screen may be provided as a plural, and the projector may selectively project onto the plurality of the screens.

The plurality of the screens may be selectively turned on, and the projector may be synchronized with the screen such that the projector is selectively focused on the turned-on screen.

The plurality of the screens may be a PDLC type or a PSCT type.

Advantageous Effects

According to the present invention, by adopting a screen and a projector instead of a rear display and a backlight unit, the cross stripes of the rear display can be removed so as to prevent the occurrence of the interference pattern (Moire phenomenon) due to the interference of different pixel patterns, and an additional diffuse layer can be omitted so that an assembling process of the multi-layer image display device can be simplified.

In addition, by selectively projecting the two-dimensional image onto the plurality of the screens, so the multi-layered image can have various depths.

DETAILED DESCRIPTION OF THE EMBODIMENTS

Embodiments of the present invention will be explained in detail with reference to the accompanied drawings.

Figure 1:
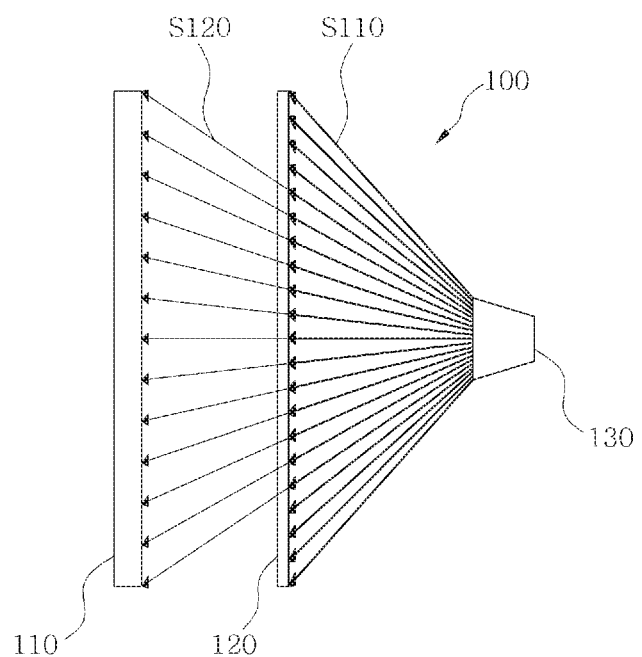
FIG. 1 is a schematic side view of a multi-layer image display device according to an embodiment of the present invention.
Figure 2:
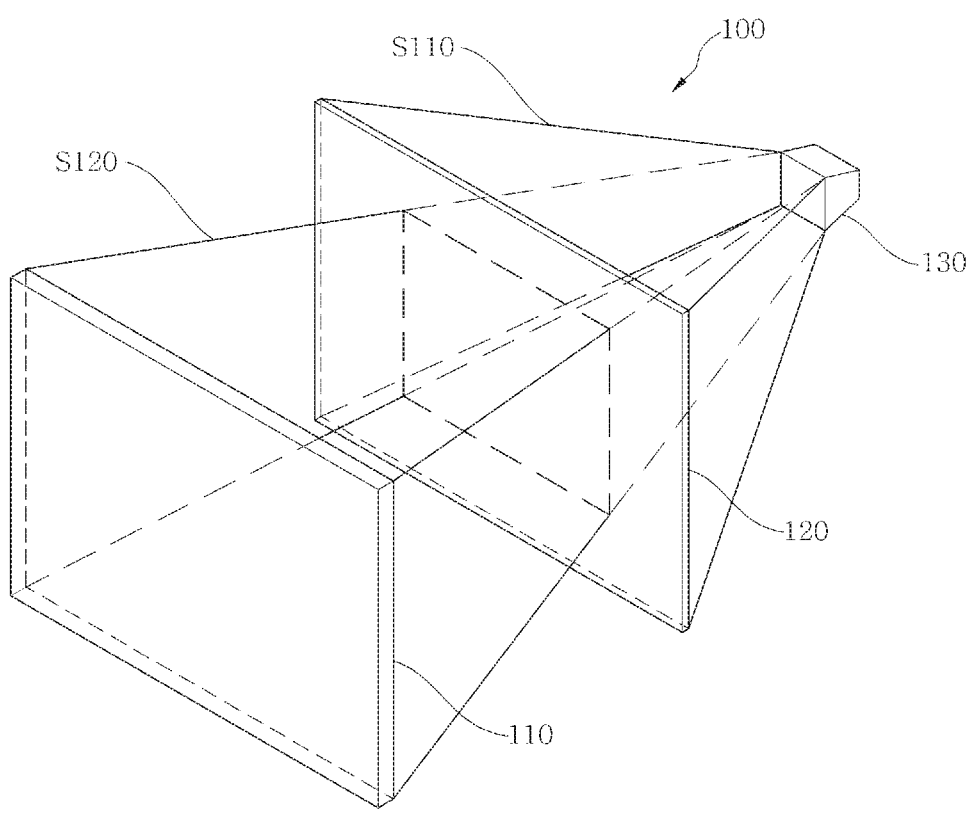
FIG. 2 is a schematic perspective view of a multi-layer image display device according to an embodiment of the present invention.

FIG. 1 is a schematic side view of a multi-layer image display device according to an embodiment of the present invention, and FIG. 2 is a schematic perspective view of a multi-layer image display device according to an embodiment of the present invention.

As shown in FIG. 1 and FIG. 2, a multi-layer image display device 100 according to an embodiment of the present invention realizes a multi-layered image with a depth by overlapping multi-layered two-dimensional images 101 and 102, and includes a display 110 which can be selectively transparent and can display first two-dimensional image 101 using combination of a plurality of pixels, a screen 120 which is disposed behind the display 110 to be overlapped in a forward-backward direction, and a projector 130 which is disposed behind the screen 120 to project the second image 102 on the screen 120.

The display 110 may be a liquid crystal display (LCD) device. However, it is not limited thereto, and other type of a display which can be selectively transparent can be used. Hereinafter, explanation will be made on the assumption that the display 110 is a LCD device.

A conventional device having overlapped LCD panels to realize multi-layered images has a problem that a noise (interference pattern) such as wood grain and water wave due to the interference between the overlapped LCD panels occurs. In order to prevent such noises, a technology in which a diffuse layer for diffusing light is interposed between two LCD panels, but in case of interposing a diffuse layer between two LCD panels, an additional assembling process is required and the productivity is deteriorated. In addition, since this method reduces the noise by diffusing cross stripes of the rear LCD panel through the diffuse layer, the occurrence of noise cannot be fundamentally removed.

In a multi-layer image display device 100 according to an embodiment of the present invention, the rear display among two displays of the conventional art is replaced with the screen 120, and the back light unit of the conventional art is replaced with a projector, so the problem of the interference pattern can be fundamentally solved and the assembling process is also simplified.

That is, although in the conventional multi-layer image display device the interference pattern is generated by the different pixel patterns of the two overlapped liquid crystal display device, the screen 120 does not have pixels in itself but receives images from the projector 130 to show the received images, so pixel patterns (cross stripe) are not formed. Accordingly, by replacing the rear liquid crystal display device with the screen 120, the occurrence of the interference pattern has been basically removed.

In case that a diffuse layer for diffusing light is interposed between two LCD panels, there is an advantage that the interference pattern is simply weakened, but in the present invention the overlapping of the pixel pattern is avoided, so the interference pattern is completely removed.

At this time, the projector 130 may be a type of LCOS (Liquid Crystal On Silicon) or DLP (Digital Light Processing). Except the CRT (Cathode Ray Tube) type which is not suitable for common use because of great size, high cost, and great weight, the projector may be divided into LCD (Liquid Crystal Display) type, LCOS type, and DLP type depending on the projection type. Among these types, LCD type has cross stripes similar with the LCD device, and may cause the noise, so it is not preferably applied to the present invention.

In addition, not shown in the drawings, the multi-layer image display device 100 according to an embodiment of the present invention may include various parts for realizing a general liquid crystal display device. However, the projector 130 plays a role of a back light unit, so in the present invention the back light unit is not provided.

The screen 120 is disposed behind the display 110 such that the display 110 and the screen 120 are seen from the front to be overlapped. At this time, the display 110 and the screen 120 are fixed to be apart from each other such that images displayed on the display 110 and the screen 120 has a depth. Parts such as a frame for fixing the display 110 and the screen 120 have been omitted.

The display 110 which is disposed at the front plays a role of a shield for the screen 120, thereby making the two-dimensional image projected on the screen 120 more clear.

In addition, the display 110 may be selectively transparent such that images on the screen 120 can be seen from the front.

Also, the screen 120 may be a transparent screen of a rear surface projection type, and the projector 130 may transmit light through the display 110.

That is, the screen 120 may be a transparent screen of a rear surface projection type in which the two-dimensional image is projected on the screen 120 from the projector 130 which is disposed at the rear side and the image can be seen from the front, and the projector 130 can transmit light having passed the screen 120 through the display 110 so that the projector 130 may play a role of a back light unit for the display 110.

In more detail, as shown in FIG. 1 and FIG. 2, light emitted from the projector 130 forms the second two-dimensional image 102 on the screen 120 (S110), and then passes through the screen 120 which is transparent and subsequently passes through the display 110 to form the first two-dimensional image 101 on the display 110 (S120). That is, the display 110 such as a liquid crystal display cannot display images through self-light-emission, the projector 130 plays a role of a conventional back light unit.

As such, by replacing the rear display and the back light unit with the screen 120 and the projector 130, cross stripe of the rear display can be fundamentally removed so as to prevent the occurrence of the interference pattern (Moire phenomenon) due to the interference between the different pixel patterns, and it is not needed to interpose the diffuse layer between the display panels, so the assembling process of the multi-layer image display device can be simplified.

Figure 3:
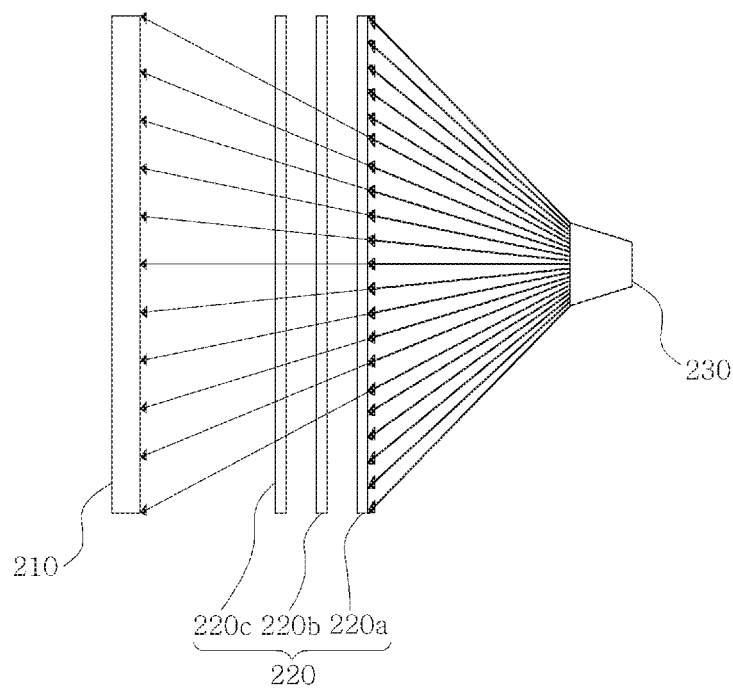
FIG. 3 is a schematic side view for explaining a first stage S210 of a driving example of a multi-layer image display device according to another embodiment of the present invention.
Figure 4:
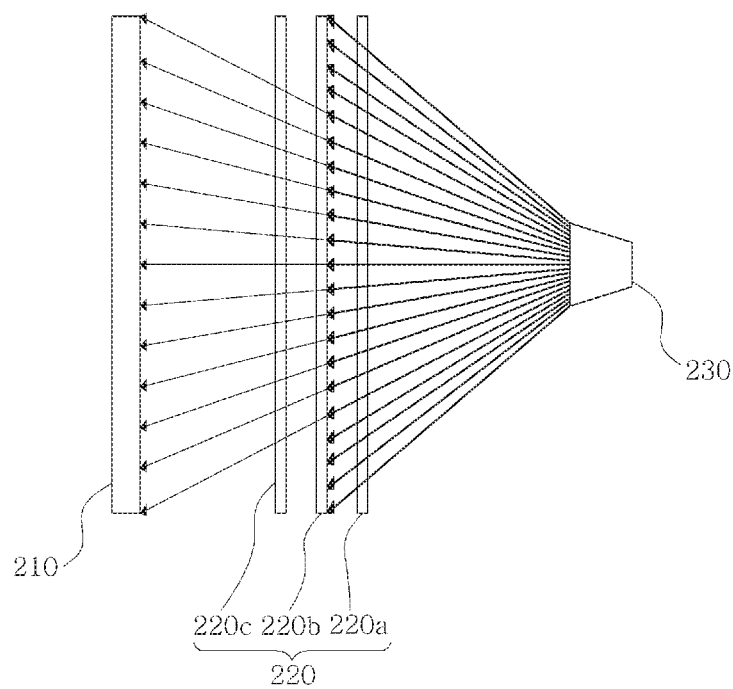
FIG. 4 is a schematic side view for explaining a second stage S220 of a driving example of a multi-layer image display device according to another embodiment of the present invention.
Figure 5:
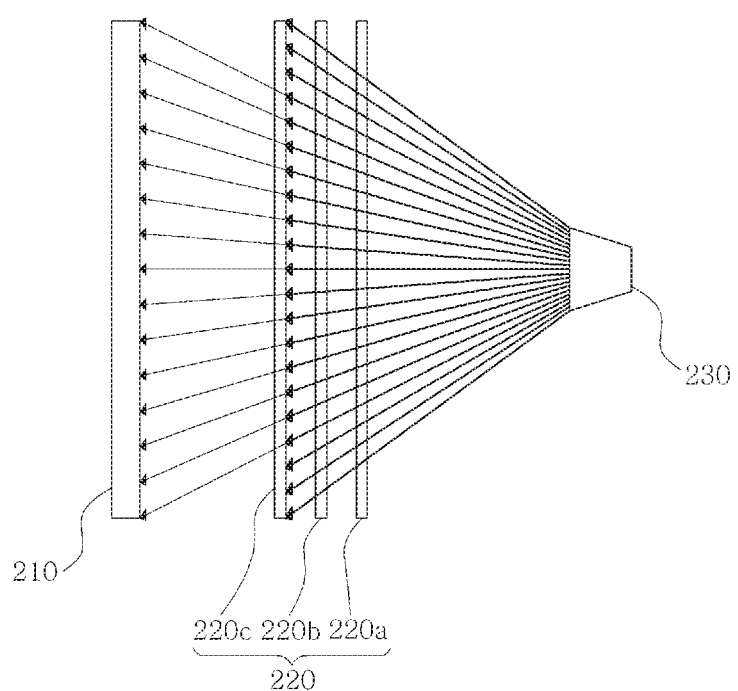
FIG. 5 is a schematic side view for explaining a third stage S230 of a driving example of a multi-layer image display device according to another embodiment of the present invention.
Figure 6:
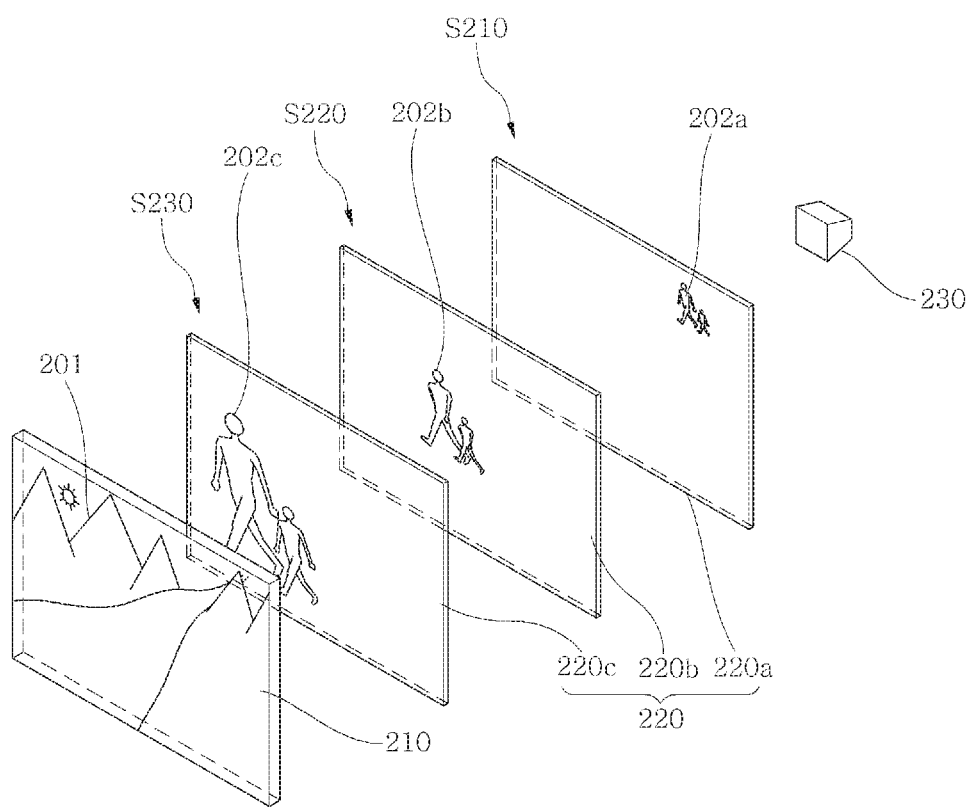
FIG. 6 is a schematic perspective view for showing a driving example of a multi-layer image display device according to another embodiment of the present invention.

FIG. 3 is a schematic side view for explaining a first stage S210 of a driving example of a multi-layer image display device according to another embodiment of the present invention, FIG. 4 is a schematic side view for explaining a second stage S220 of a driving example of a multi-layer image display device according to another embodiment of the present invention, and FIG. 5 is a schematic side view for explaining a third stage S230 of a driving example of a multi-layer image display device according to another embodiment of the present invention. FIG. 6 is a schematic perspective view for showing a driving example of a multi-layer image display device according to another embodiment of the present invention.

As shown in FIG. 3 to FIG. 6, the screens 220 may be provided with the plural, and the projector 230 may selectively project two-dimensional images on the screens 220.

Exemplarily, as shown in FIG. 3 to FIG. 6, the screens 220 may be provided with three. These are respectively referred as a first screen 220a, a second screen 220b, and a third screen 220c, and the projector 230 may select one of the screens 220a, 220b, and 220c, and projects the second two-dimensional image on the selected screen.

For example, if the projector 230 projects the two-dimensional image onto the first screen 220a as shown in FIG. 3, the second two-dimensional image 202 may be formed deeply with respect to the first two-dimensional image 201, so the depth effect of the multi-layered image may be enhanced, and if the projector 230 projects the two-dimensional image onto the third screen 220c as shown in FIG. 5, the second two-dimensional image 202 are shallowly formed with respect to the first two-dimensional image 201, so the depth effect of the multi-layered image can be reduced.

As an example, referring to FIG. 6, in a state that a background image is displayed on the display 210 as the first two-dimensional image 201, the projector 230 may phasedly change the screen on which the second two-dimensional image is projected in accordance with the steps of the first step S210 (FIG. 3) in which the projector 230 projects the second two-dimensional image 202a that a person comes on foot from the long distance on the first screen 220a, the second step S220 (FIG. 4) in which the projector 230 projects the second two-dimensional image 202b that a person comes on foot from the medium distance on the second screen 220b, and the third step S230 (FIG. 5) in which the projector 230 projects the second two-dimensional image 202c that a person comes on foot from the short distance on the third screen 220c. Accordingly, when compared to the case in which the second two-dimensional image is projected on one screen, the depth effect, the perspective effect, and the cubic effect can be further enhanced.

The display 210 may be a liquid crystal display device. However, it is not limited thereto, and it may also be other type of a display which can be selectively transparent. Hereinafter, explanation will be made on the assumption that the display 210 is a LCD device.

The screens 220 are selectively turned on, and the projector 230 may be synchronized with the screens 220 so as to be focused with the turned-on screen.

For example, referring to FIG. 3 to FIG. 6, in the first step S210 (FIG. 3) in which the projector 230 projects the second two-dimensional image 202a onto the first screen 220a, only the first screen 220a among the plurality of the screens 220 is selectively turned on, and the second screen 220b and the third screen 220c is maintained to be turned off (this means to be transparent). As such, in case that only the first screen 220a is selectively turned on, the projector 230 is controlled to project the second two-dimensional image onto the first screen 220a, and this control may be accomplished by the synchronization of the projector 230 and the plurality of the screens 220. In addition, in the second step S220 (FIG. 4) in which the image is projected onto the second screen 220b, only the second screen 220b is turned on, and the projector 230 may be focused on the second screen 220b. The third step S230 (FIG. 5) can also be performed in a similar way.

For the selective turn on/off of the screen, the screens 220 may be a PDLC (Polymer Dispersed Liquid Crystal) type or a PSCT (Polymer Stabilized Cholesteric Textures) type.

The PDLC type screen is composed of dispersed droplets of solid polymer. The droplets are disorderly disposed in a state that the driving voltage is turned off so that the light is hindered by the refraction of the droplet, and the polymer to be scattered, and the droplets are linearly disposed in a state that the driving voltage is turned on so that the difference of the refraction is reduced to make the screen to be transparent. For example, referring to FIG. 6, in order to selectively turn on the second screen 220b, the driving electric voltage may be applied to the first screen 220a and the third screen 220c. That is, the driving electric voltage is turned off in the selected screen, the selected screen is selectively turned on so that the second two-dimensional image 202 can be projected on the selected screen.

Also, in the PSCT type screen, liquid crystal is arranged in vertical structure by the strong electric field, and thereby light is passed therethrough. For example, referring to FIG. 6, in order to selectively turn on the first screen 220a, the electric field is applied only to the second screen 220b and the third screen 220c. That is, if the electric field is selectively turned off for the selected screen, the selected screen is selectively turned on so that the second two-dimensional image 202 can be projected on the selected screen.

The screens 120 may be a transparent screen of a rear surface projection type, and the projector 230 may transmit light through the display 210.

That is, the screen 220 may be a transparent screen of a rear surface projection type in which the two-dimensional image 102 is projected on the screen 220 from the projector 230 which is disposed at the rear side and the image can be seen from the front, and the projector 230 can transmit light having passed the screen 220 through the display 210 so that the projector 230 may play a role of a back light unit for the display 210.

The projector 230 may be a LCOS type or DLP type. The LCD type has cross stripes due to the pixel patterns similar with the LCD device and may cause the noise, so it is not preferably applied to the present invention.

As such, by selectively projecting two-dimensional image onto the plurality of the screens 220, the multi-layered image can be realized with various depths.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to an image display device and can be applied to various displays, so the present invention has an industrial applicability.

The invention claimed is:
1. A multi-layer image display device for realizing a multi-layered image with a depth by overlapping a plurality of two-dimensional images, comprising:
   a liquid crystal display device which can be selectively transparent and produce a first two-dimensional image through a combination of a plurality of pixels,
   a plurality of screens disposed behind the liquid crystal display device so as to be overlapped in a forward-backward direction with the liquid crystal display device; and
   a projector which is disposed behind the plurality of screens that is disposed behind the liquid crystal display device, so as to project a second two-dimensional image selectively on one of the plurality of the screens,
   wherein the plurality of the screens are selectively turned on, and the projector is synchronized with the plurality of the screens such that the projector is selectively focused on a turned-on screen of the plurality of the screens,
   wherein the liquid crystal display device has a first side facing the plurality of screens and a second side opposite to the first side, and the liquid crystal display device is selectively transparent, and both the first two-dimensional image displayed on the liquid crystal display device and the second two-dimensional image displayed on the turned-on screen are simultaneously seen from a same direction from the second side,
   wherein the projector provides a backlight to the liquid crystal display device, and
   wherein the liquid crystal display device, the screens and the projector providing the backlight are disposed in this order, and the backlight produced by the projector passes through the screens and then illuminates the liquid crystal display device to produce the first two-dimensional image on the liquid crystal display device, with the screens being disposed between the first two-dimensional image and the projector providing the backlight.

2. The multi-layer image display device of claim 1, wherein each of the plurality of the screens is a transparent screen of a rear surface projection type, and the projector transmits light through the liquid crystal display device.

3. The multi-layer image display device of claim 1, wherein the projector is a Liquid Crystal On Silicon (LCOS) type or a Digital Light Processing (DLP) type.

4. The multi-layer image display device of claim 1, wherein the plurality of the screens are a Polymer Dispersed Liquid Crystal (PDLC) type or a Polymer Stabilized Cholesteric Textures (PSCT) type.

5. The multi-layer image display device of claim 1, wherein each of the plurality of screens includes a first surface facing the liquid crystal display device and an opposite second surface facing the projector.

6. The multi-layer image display device of claim 1, wherein the liquid crystal display device is apart from the plurality of screens.

7. The multi-layer image display device of claim 1, wherein the projector emits light which forms the second two-dimensional image selectively on said one of the plurality of the screens.

8. The multi-layer image display device of claim 1, wherein each of the plurality of screens does not have pixels, avoiding overlapping of pixel patterns between the screens and the liquid crystal display device that has the plurality of pixels.

9. The multi-layer image display device of claim 1, wherein the first two-dimensional image is a background image for the second two-dimensional image, and the liquid crystal display device is selectively transparent such that the second two-dimensional image is seen from the second side through the liquid crystal display device, to be overlapped with the background image.

\* \* \* \* \*